Dec. 6, 1966   C. L. MEDEIROS ETAL   3,290,011
LINE PULLING APPARATUS
Filed Aug. 21, 1964
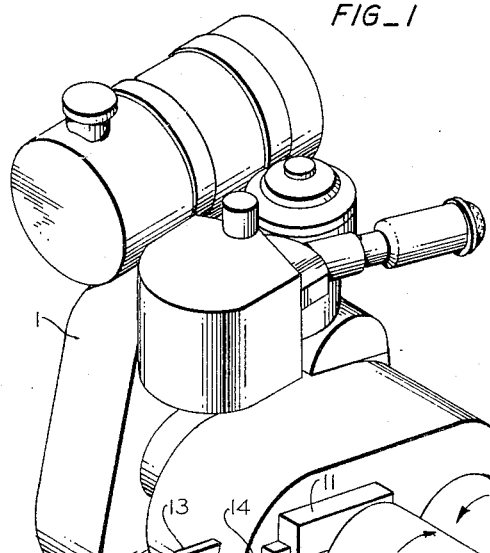
FIG_1
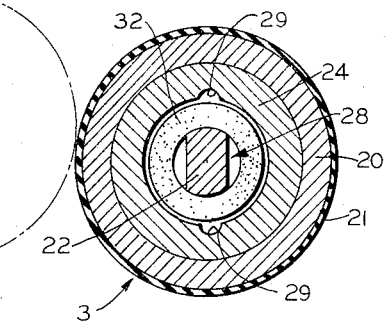
FIG_3
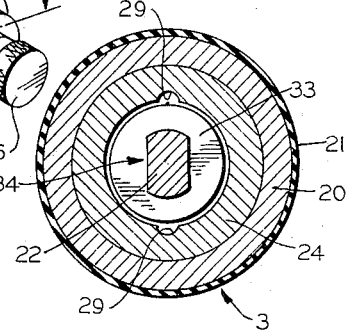
FIG_4
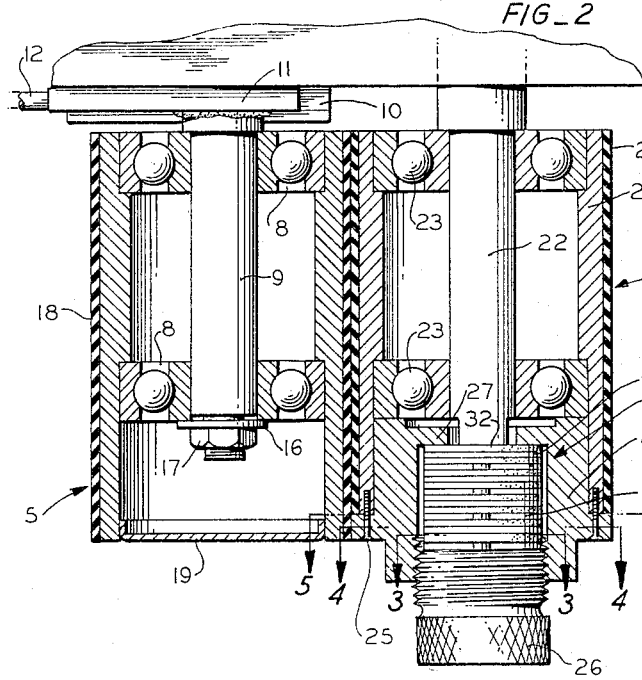
FIG_2
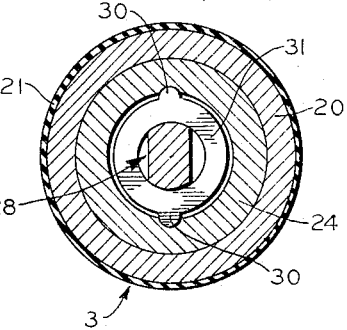
FIG_5
INVENTORS
CHARLES L. MEDEIROS
ROBERT L. CORDEIRO
BY Hoppe and Mitchell
ATTORNEYS

3,290,011
LINE PULLING APPARATUS

Charles L. Medeiros, 2547 Iao Road, Wailuku, Maui, Hawaii, and Robert L. Cordeiro, 208 Molokai Hema St., Kahului, Maui, Hawaii
Filed Aug. 21, 1964, Ser. No. 391,121
2 Claims. (Cl. 254—175.5)

This invention relates generally to power devices for pulling lines, cables and the like and more particularly it relates to power driven rollers for pulling deep sea fishing lines.

Heretofore deep sea fishing lines usually have been pulled by hand. These lines are generally made of nylon and may be as long as 150 fathoms in length. Fishing with the lines varies anywhere from 40 fathoms to 150 fathoms. It is extremely tiring work to pull the lines by hand for any extended period. One object of this invention, therefore, is to provide a powered line pulling apparatus which eliminates the heavy manual labor presently involved in pulling multiple deep sea fishing lines.

Another object of this invention is to provide a line pulling apparatus which is simply constructed and compact for ease of operation and maintenance aboard fishing vessels or in remote land locations.

One other object of this invention is to provide a line pulling apparatus having adjustable friction clutch means to develop a drag on the line for "playing" a hooked fish, while simultaneously making available power means for pulling the line should the line pull slacken to less than the drag setting.

Other objects and advantages of this invention will become apparent to those skilled in this art upon consideration of the described embodiment and the accompanying drawing, wherein:

FIG. 1 is a perspective view of one embodiment of the described apparatus;

FIG. 2 is a partial horizontal sectional view of the apparatus taken along line 2—2 of FIG. 1;

FIG. 3 is a cross-sectional view of the drive roller taken along line 3—3 of FIG. 2 to illustrate a friction disk of the clutch means;

FIG. 4 is a cross-sectional view of the drive roller taken along line 4—4 of FIG. 2 to illustrate the configuration of the clutch drive disks mounted on the drive shaft; and FIG. 5 is a cross-sectional view of the drive roller taken along line 5—5 of FIG. 2 to illustrate the clutch drive roller disks.

The line pulling apparatus disclosed in the illustrated embodiment comprises a power drive means, illustrated as a two cycle gasoline engine 1, mounted on a pedestal supported rigid supporting frame 2. Other drive means such as electric or pneumatic motors also are useful sources of motive power. The gasoline engine of FIG. 1 powers a drive roller 3 connected to it through an axial friction disk clutch referred to generally as 4 and illustrated in more detail in FIGS. 2-5. An idler roller 5 is rotatably mounted upon the frame 2 and is urged into rolling contact with drive roller 3 by spring biasing means 6.

A nylon deep sea fishing line 7 training over the drive roller 3 and between it and idler roller 5 is pulled from right to left in FIG. 1 as the gasoline engine rotates the drive roller unidirectionally as indicated by the arrow. The driver roller itself may be rotatable in opposition to the engine drive depending upon the friction disk clutch adjustment.

A firm grip on line 7 is maintained by spring biasing means 6 which adjustably urges idler roller 5 into tight rolling contact with drive roller 3. The idler roller is rotatably mounted by means of ball bearings 8 upon a stub shaft 9 welded to slide 10. The slide is slideable in a direction perpendicular to the rotational axis of the idler roller within slide bracket 11. The slide bracket 11 is rigidly fixed to the frame 2. A knurled-head thumb screw 12 threaded in angle bracket 13 also mounted on frame 2 abuts at one end the slide 10 and urges the idler roller carried upon it into firm rolling contact with the drive roller. The thumb screw 12 carries a flange 14 near the end opposite its head. A coil spring 15 wound around the thumb screw shaft bears against angle bracket 13 at one end and flange 14 at the other to urge the end of the screw into firm engagement with slide 10. A retaining washer 16 and nut 17 threaded upon the end of the stub shaft secure the idler roller and its supporting bearings 8 upon the stub shaft. The roller surface is covered with a semi-resilient rubber facing 18 to firmly grip the line passing between rollers. A cap 19 closes the end of the roller.

Drive roller 3 comprises a hollow sleeve 20 also encased in a sheath 21 of rubber or similar semi-resilient material. This roller is mounted upon rotatable drive shaft 22 driven directly by the gasoline engine 1. The drive shaft 22 is oriented in parallelism with stub shaft 9 and is journalled on frame 2. Shoulders on the interior surface of sleeve 20 and drive shaft 22 space and secure ball bearings 23 so that sleeve 20 is freely rotatable about and independent of drive shaft 22. End piece 24 fits into the open end of the sleeve against the outermost bearing 23 and is secured in place by machine screws 25. The end piece has a central bore which fits over the end of drive shaft 22. The bore diameter is substantially larger than the outside diameter of shaft 22 to receive an axial friction disk clutch.

The disk clutch comprises an alternating series of fiber, slotted and eared disks which are frictionally engaged against one another by means of a knurled knob 26 which threads into the bore of end piece 24. The inner end of the bore carries an inwardly extending flange 27 against which bears the innermost of the disks when the knob is screwed down into engagement with them. The disk orientation is more easily observed in FIGS. 3-5. The outer end of drive shaft 22 is provided with two opposed and parallel machined flats 28. The inner surface of the bore of end piece 24 is machined with a pair of opposed arcuate slots 29 running lengthwise of the bore. These slots receive the ears 30 protruding from each of four eared disks 31. These disks have an outer diameter substantially the same as the bore of end piece 24 and an inner bore of a diameter slightly larger than the outside diameter of shaft 22 so that the disks will easily slide over the shaft.

The outermost disk of the clutch comprises an eared disk 31 bearing against the knob 26. Adjacent to the eared disk is an annular fiber friction disk 32 illustrated in FIG. 3 as having an outer diameter the same as that of eared disk 31 and an inner bore of diameter sufficient to clear the drive shaft 22. Adjacent to the first friction disk 32 is a drive disk 33 illustrated in FIG. 4. These disks and the eared disks 31 are fabricated from brass or similar metal and have an outer diameter slightly less than the bore of end piece 24. Each drive disk 33 has a centerline slot 34 of the same configuration as the cross-section of the end of drive shaft 22 which fits snugly over the end flats 28. Inwardly from the first drive disk 33 is a second fiber disk followed by a second eared disk, etc. In the described embodiment a total of four eared disks, eight fiber friction disks and four slotted drive disks are provided with the last of the eight fiber disks bearing against flange 27 at the end of the end piece bore. The number of disks in the clutch of course can be varied for various service conditions.

The disk clutch transmits power from drive shaft 22 to the sleeve 20 of drive roller 3 and rotates the drive roller to pull the line placed between it and the idler roller. The eared disks with their ears fitting within the slots 29 of end piece 24 always rotate with the drive roller. The slotted drive disks 33 fit snugly on the flattened end of the drive shaft and always rotate unidirectionally with the shaft. As the knob 26 is turned into the threads of end piece 24 it forces the several disks into frictional engagement with each other so that the power from drive shaft 22 is frictionally transmitted to sleeve 20. At all times, however, the sleeve 20 is rotatable contra to the direction of rotation of the drive shaft 24 if sufficient counter-rotating torque is applied to it by the line 7 to overcome the disk friction and cause adjacent disks to slip. Thus, a heavy fish hooked to the end of line 7 may develop sufficient counter-torque upon drive roller 3 to rotate the roller in a direction contra to the unidirectional rotation of drive shaft 22. This feature together with the adjustable nature of knob 26 provides an adjustable drag on the drive roller to "play" a fish hooked to the end of line 7. At the same time, as soon as the counter-torque on drive roller 3 diminishes below a critical amount, the continuously rotating drive disks 33 through frictional engagement with the fiber disks 32 and eared disks 31 will rotate the drive roller in the same direction as the drive shaft and pull the line 7 from right to left as illustrated in FIG. 1.

The described embodiment of the invention has been given for illustrative purposes only and no unnecessary limitation should be understood therefrom for various modifications will be apparent to those familiar with this art such as the substitution of various clutch and drag devices, for example. The invention is defined in the appended claims.

We claim:
1. A line pulling apparatus comprising a rigid frame; a drive shaft rotatably mounted on said frame; drive means for unidirectionally rotating said drive shaft; a drive roller rotatable upon said drive shaft in either direction about the axis of said drive shaft; axial disk clutch means selectively frictionally interconnecting said drive shaft and said drive roller; means for adjustably controlling the amount of frictional interconnection between said drive shaft and said drive roller; an idler roller in rolling contact with said drive roller; means resiliently biasing said idler roller into rolling contact with said drive roller and means carried by said rigid frame for rotatably mounting said drive shaft, drive roller and idler roller at one end thereof, so that the ends of said rollers remote from said rigid frame are free for insertion and removal of the line to be pulled.

2. A line pulling apparatus as recited in claim 1 in which said drive roller comprises a hollow sleeve concentrically mounted with respect to the axis of said drive shaft; an end piece secured to the end of said sleeve remote from said rigid frame; said end piece defining a bore into which the outer end of said drive shaft protrudes, said axial disk clutch means being positioned within said bore for frictionally interconnecting said drive shaft with said end piece whereby said drive shaft is frictionally interconnected with said drive roller.

References Cited by the Examiner
UNITED STATES PATENTS

| | | | |
|---|---|---|---|
| 832,069 | 10/1906 | Lindquist | 254—175.5 |
| 919,042 | 4/1909 | Lindquist | 254—175.5 |
| 3,166,269 | 1/1965 | Veroli | 254—187 |

FOREIGN PATENTS 1,121,039   4/1956   France.

SAMUEL F. COLEMAN, *Primary Examiner.*